United States Patent
Hwang et al.

(10) Patent No.: US 10,564,742 B2
(45) Date of Patent: Feb. 18, 2020

(54) TOUCH PANEL AND APPARATUS FOR DRIVING THEREOF

(71) Applicant: LG Display Co., Ltd., Seoul (KR)

(72) Inventors: Jong Hee Hwang, Goyang-si (KR); Ki Duk Kim, Paju-si (KR); Sung Yong Cho, Seoul (KR); Eun Jung Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 735 days.

(21) Appl. No.: 14/714,180

(22) Filed: May 15, 2015

(65) Prior Publication Data
US 2015/0370356 A1 Dec. 24, 2015

(30) Foreign Application Priority Data
Jun. 23, 2014 (KR) .................. 10-2014-0076794

(51) Int. Cl.
*G06F 3/044* (2006.01)
*G06F 3/041* (2006.01)

(52) U.S. Cl.
CPC .............. *G06F 3/041* (2013.01); *G06F 3/044* (2013.01); *G06F 3/0416* (2013.01)

(58) Field of Classification Search
CPC ...... G06F 3/041; G06F 3/0414; G06F 3/0416; G06F 3/044
USPC ................................... 345/173–174
See application file for complete search history.

(56) References Cited

U.S. PATENT DOCUMENTS

| | | | |
|---|---|---|---|
| 8,874,396 B1 * | 10/2014 | Olson et al. .................... 702/69 |
| 2007/0074914 A1 | 4/2007 | Geaghan et al. |
| 2008/0122798 A1 * | 5/2008 | Koshiyama ........... G06F 3/0412 345/173 |
| 2010/0123678 A1 | 5/2010 | Kim et al. |
| 2012/0038583 A1 | 2/2012 | Westhues et al. |
| 2013/0033450 A1 * | 2/2013 | Coulson et al. .............. 345/174 |
| 2013/0082763 A1 * | 4/2013 | Inada et al. ................... 327/517 |
| 2013/0215049 A1 | 8/2013 | Lee |
| 2013/0335366 A1 | 12/2013 | Lee et al. |
| 2014/0062934 A1 | 3/2014 | Coulson et al. |

(Continued)

FOREIGN PATENT DOCUMENTS

| | | |
|---|---|---|
| CN | 103257740 | 8/2013 |
| CN | 103513813 | 1/2014 |
| EP | 1840715 | 10/2007 |

(Continued)

OTHER PUBLICATIONS

Extended European Search Report for European Patent Application No. EP 15170790.8, dated Oct. 20, 2015, 8 Pages.

(Continued)

*Primary Examiner* — Hang Lin
(74) *Attorney, Agent, or Firm* — Fenwick & West LLP

(57) ABSTRACT

Embodiments relate to a touch panel and a method of operating the touch panel. The touch panel includes first electrodes and second electrodes separated from and intersecting the first electrodes. The first electrodes are applied with a touch driving pulse during a first sensing mode and a second sensing mode. The second electrodes sense a first touch sense signal responsive to the touch driving pulse in the first sensing mode. A subset of the second electrodes senses a second touch sense signal responsive to the touch driving pulse in the second sensing mode.

8 Claims, 9 Drawing Sheets

(56) References Cited

U.S. PATENT DOCUMENTS

2014/0078096 A1    3/2014    Tan et al.
2015/0138104 A1    5/2015    Sugita

FOREIGN PATENT DOCUMENTS

| | | |
|---|---|---|
| EP | 2629183 A2 | 8/2013 |
| GB | 2469386 | 10/2010 |
| JP | 2000047808 | 2/2000 |
| JP | 2011081524 | 4/2011 |
| JP | 2011232992 | 11/2011 |
| JP | 2011-242908 | 12/2011 |
| JP | 2012-225727 | 11/2012 |
| JP | 2013-168121 | 8/2013 |
| JP | 2013-537673 | 10/2013 |
| TW | 201032116 | 9/2010 |
| TW | M459449 | 8/2013 |
| TW | 201337700 | 9/2013 |
| TW | M476311 | 4/2014 |
| WO | WO 2013/161867 | 10/2013 |

OTHER PUBLICATIONS

Office Action for Japanese Patent Application No. JP 2015-124923, dated Jun. 7, 2016, 4 Pages (With Concise Explanation of Relevance).

Office Action for Taiwanese Patent Application No. TW 104118019, dated Jun. 20, 2016, 4 Pages (With Concise Explanation of Relevance).

Office Action for Taiwanese Patent Application No. TW 105142546, dated Aug. 23, 2017, 6 Pages. (With English Translation).

Communication Pursuant to Article 94(3) EPC for European Patent Application No. EP 15170790.8, dated Jul. 27, 2017, 6 Pages.

First Office Action for Chinese Patent Application No. CN 201510349855.X, dated Aug. 1, 2017, 23 Pages (With English Translation).

\* cited by examiner

TOUCH PANEL AND APPARATUS FOR DRIVING THEREOF

CROSS REFERENCE TO RELATED APPLICATIONS

This application claims the benefit of the Korean Patent Application No. 10-2014-0076794 filed on Jun. 23, 2014, which is hereby incorporated by reference as if fully set forth herein.

BACKGROUND

Field of the Disclosure

Embodiments of the present invention relate to a touch panel, and more particularly, to a touch panel enabling both touch force sensing and touch point sensing, and an apparatus for driving thereof.

Discussion of the Related Art

A touch panel is a type of input device that is included in image displaying devices such as Liquid Crystal Displays (LCDs), Field Emission Displays (FEDs), Plasma Display Panel (PDPs), Electroluminescent Displays (ELDs), Electrophoretic Display (EPDs), and Organic Light Emitting Devices (OLEDs), and allows a user to input information by pressing or touching a touch sensor of a screen with a finger, a pen or the like while a user looks at the screen of the image displaying device.

Recently, the touch panel is widely used for an input device of portable information devices such as smart phone and table PC, and also used for an input device of electronic equipment such as computer monitor, monitor and television.

According to a touch sensing method, the touch panel may be classified into a resistive type, a capacitance type, and an infrared sensing type. The capacitance touch panel has attracted great attentions owing to advantages of easy manufacturing method and sensitivity. The capacitance touch panel may be classified into a mutual capacitance type and a self capacitance type. In comparison to the self capacitance type touch panel, the mutual capacitance type touch panel is advantageous in that it enables a multi-touch input.

In case of a general touch panel, a touch point may be sensed by the use of finger or pen. However, it is difficult to sense a touch force, that is, touch pressure. Accordingly, U.S. Patent Application Publication Number 2014/0062933 published on Mar. 6, 2015 (hereinafter, referred to as "'933 Patent Document") discloses a capacitance touch panel which senses both touch force and touch point.

As shown in FIG. 1, in case of the capacitance touch panel disclosed in the '933 Patent Document, a touch force is sensed by a change of capacitance (Cm1) in accordance with the decrease of distance in between a pair of force sensing electrodes 12 and 22 being overlapped with each other and being parallel to each other, and a touch point is sensed by a change of capacitance (Cm2) in accordance with a fringe field in between a pair of point sensing electrodes 14 and 24 being not overlapped with each other and crossing each other.

However, the capacitance touch panel disclosed in the '933 Patent Document has the following disadvantages.

The force sensing electrodes 12 and 22 for sensing the touch force are separated from the point sensing electrodes 14 and 24 for sensing the touch point so that it causes a complicated electrode structure. In addition, a touch resolution is lowered due to the point sensing electrodes 14 and 24 crossing each other.

Also, efficiency of sensing the touch force is proportional to an area of the force sensing electrodes 12 and 22 facing each other. Thus, if the force sensing electrodes 12 and 22 are decreased in size so as to improve the touch resolution, the efficiency of sensing the touch force is lowered.

In order to improve the touch resolution, if the point sensing electrodes 14 and 24 are overlapped with each other, the capacitance (Cm2) formed between the point sensing electrodes 14 and 24 is maintained at a constant value without regard to a touch of conductive object, whereby the efficiency of sensing the touch point is lowered.

SUMMARY

Accordingly, embodiments of the present invention are directed to a touch panel that substantially obviates one or more problems due to limitations and disadvantages of the related art, and an apparatus for driving thereof.

An aspect of embodiments of the present invention is directed to provide a touch panel which facilitates to improve both efficiency of sensing a touch force and efficiency of sensing a touch point, and an apparatus for driving thereof.

In one or more embodiments, a touch panel includes first electrodes and second electrodes separated from and intersecting the first electrodes. The first electrodes are applied with a touch driving pulse during a first sensing mode and a second sensing mode. The second electrodes sense a first touch sense signal responsive to the touch driving pulse in the first sensing mode. A subset of the second electrodes senses a second touch sense signal responsive to the touch driving pulse in the second sensing mode.

In one or more embodiments, the touch panel further includes an elastic dielectric member disposed between the first electrodes and the second electrodes.

In the first sensing mode, the second electrodes may sense the first touch sense signal based at least in part on a first capacitance between the first electrodes and the second electrodes responsive to the touch driving pulse. In the second sensing mode, the subset of the second electrodes may sense the second touch sense signal based at least in part on a second capacitance between the first electrodes and the subset of the second electrodes responsive to the touch driving pulse, where the second capacitance is less than the first capacitance.

In one or more embodiments, the second electrodes include touch sensing electrodes and adjacent electrodes adjacent to the touch sensing electrodes. The subset of the second electrodes may include the touch sensing electrodes but may exclude the adjacent electrodes. The adjacent electrodes may have an elongated rectangular shape in parallel with the touch sensing electrodes.

In the first sensing mode, the first touch sense signal from at least one of the touch sensing electrodes and one or more of the adjacent electrodes adjacent to said one of the touch sensing electrodes may be sensed to determine a force of the touch on the touch panel. In the second sensing mode, the second touch sense signal from said one of the touch sensing electrodes but excluding the adjacent electrodes adjacent to said one of the touch sensing electrodes may be sensed to determine a location of the touch on the touch panel.

In the first sensing mode, the one or more adjacent electrodes may be electrically coupled to said one of the touch sensing electrodes. In the second sensing mode, the one or more adjacent electrodes may be electrically decoupled from said one of the touch sensing electrodes. In the second sensing mode, the one or more adjacent electrodes may be in an electrically floating state.

In one or more embodiments, the adjacent electrodes include first adjacent electrodes and second adjacent electrodes, where each of the touch sensing electrodes is disposed between one of the first adjacent electrodes and one of the second adjacent electrodes. Said one of the first adjacent electrodes and said one of the second adjacent electrodes may be physically connected to each other. The touch panel may further include first routing lines and second routing lines. Each of the first routing lines may be connected to corresponding one of the touch sensing electrodes and each of the second routing lines may be connected to corresponding one of the first adjacent electrodes.

In one or more embodiments, responsive to determining the location of the touch in the second sensing mode, one or more selected electrodes from the first electrodes corresponding to the location of the touch are applied with the touch driving pulse to determine the force of the touch individually one at a time.

In one or more embodiments, responsive to failing to determine the location of the touch in the second sensing mode, a group of electrodes from the first electrodes are applied with the touch driving pulse to determine the force of the touch simultaneously.

In one or more embodiments, responsive to determining the force of the touch through the group of electrodes, one or more selected electrodes from the group of electrodes may be applied with the touch driving pulse to determine the location and the force of the touch individually one at a time. Responsive to failing to determine the force of the touch through the group of electrodes, the first electrodes may be applied with the touch driving pulse to determine the location of the touch in the second sensing mode.

Additional advantages and features of embodiments of the invention will be set forth in part in the description which follows and in part will become apparent to those having ordinary skill in the art upon examination of the following or may be learned from practice of embodiments of the invention. The objectives and other advantages of embodiments of the invention may be realized and attained by the structure particularly pointed out in the written description and claims hereof as well as the appended drawings.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
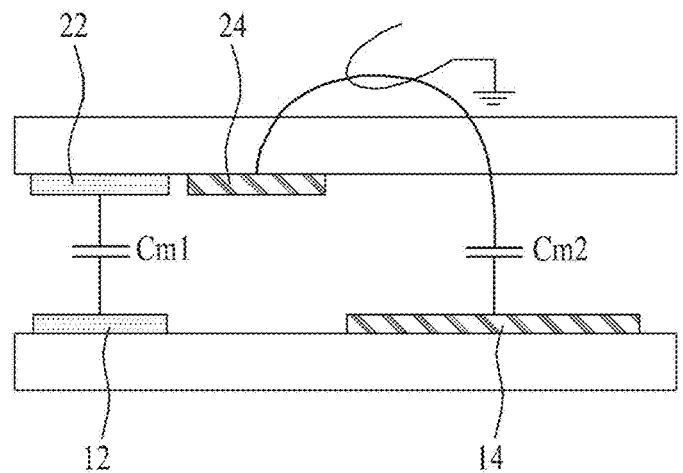
FIG. 1 is a cross sectional view illustrating a simplified arrangement of electrodes in a touch panel disclosed in the '933 Patent Document.

Reference will now be made in detail to the exemplary embodiments of the present invention, examples of which are illustrated in the accompanying drawings. Wherever possible, the same reference numbers will be used throughout the drawings to refer to the same or like parts.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

A shape, a size, a ratio, an angle, and a number disclosed in the drawings for describing embodiments of the present invention are merely an example, and thus, the present invention is not limited to the illustrated details. Like reference numerals refer to like elements throughout. In the following description, when the detailed description of the relevant known function or configuration is determined to unnecessarily obscure the important point of the present invention, the detailed description will be omitted. In a case where 'comprise', 'have', and 'include' described in the present specification are used, another part may be added unless 'only~' is used. The terms of a singular form may include plural forms unless referred to the contrary. In construing an element, the element is construed as including an error region although there is no explicit description.

In description of embodiments of the present invention, when a structure (for example, an electrode, a line, a wiring, a layer, or a contact) is described as being formed at an upper portion/lower portion of another structure or on/under the other structure, this description should be construed as including a case where the structures contact each other and moreover, a case where a third structure is disposed therebetween.

In describing a time relationship, for example, when the temporal order is described as 'after~', 'subsequent~', 'next~', and 'before~' a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in co-dependent relationship.

Hereinafter, a touch panel according to the embodiment of the present invention and an apparatus for driving thereof will be described with reference to the accompanying drawings.

Figure 2:
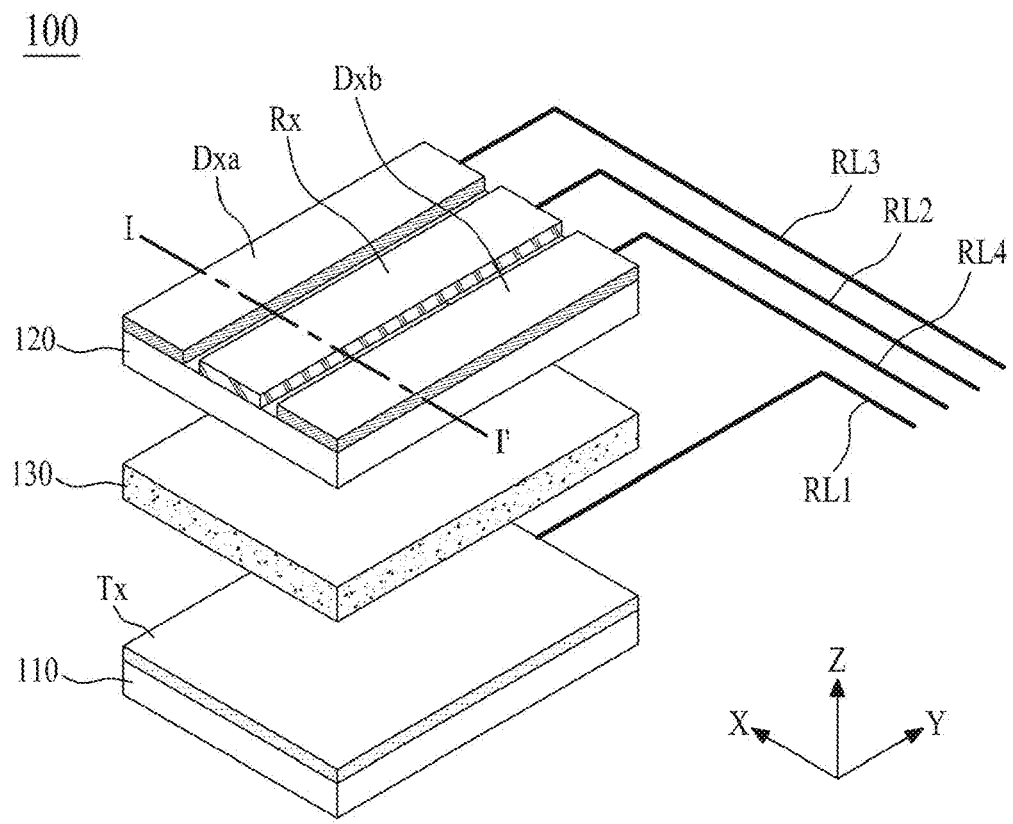
FIG. 2 illustrates a simplified structure of a touch panel according to the first embodiment of the present invention.
Figure 3:
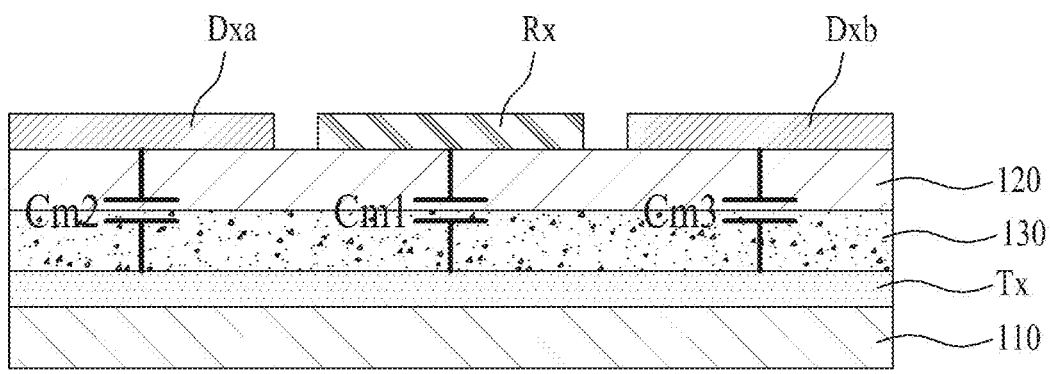
FIG. 3 is a cross sectional view of the touch panel along I-I' shown in FIG. 2.

FIG. 2 illustrates a simplified structure of a touch panel according to the first embodiment of the present invention. FIG. 3 is a cross sectional view of the touch panel along I-I' shown in FIG. 2.

Referring to FIGS. 2 and 3, a touch panel 100 according to the first embodiment of the present invention is disposed (or attached to) on a display panel of an image displaying device (not shown). The touch panel 100 according to the first embodiment of the present invention generates touch point sensing data and/or touch force sensing data in accordance with a user's touch, and provides the generated data to an external host system (not shown). For example, if a display panel is a liquid crystal display panel (or organic light emitting display panel) including an upper polarizing film, the touch panel 100 may be disposed on the upper polarizing film, or may be disposed between an upper substrate and the upper polarizing film. The touch panel 100 may include a first substrate 110 with a touch driving electrode (Tx), a second substrate 120 with a touch sensing electrode (Rx) and first and second dummy electrodes (Dxa, Dxb), and an elastic dielectric member 130 disposed between the first and second substrates 110 and 120.

The first substrate 110 may be formed of a transparent plastic material. The first substrate 110 may be attached to an upper surface of display panel by the use of transparent adhesive (not shown).

The touch driving electrode (Tx) is provided in a first direction (X) on the first substrate 110, wherein the touch driving electrode (Tx) is formed in a bar shape with a predetermined area. The touch driving electrode (Tx) is connected with a touch driving circuit (not shown) through a driving routing line (RL1), and is supplied with a touch driving pulse from the touch driving circuit.

In the same manner as the first substrate 110, the second substrate 120 may be formed of the transparent plastic material. The second substrate 120 and the first substrate 110 face each other, and the elastic dielectric member 130 is interposed between the first substrate 110 and the second substrate 120. In addition, a cover window (not shown) may be attached to an upper surface of the second substrate 120 by the use of transparent adhesive.

The touch sensing electrode (Rx) is provided in a second direction (Y) on the second substrate 120 being overlapped with the touch driving electrode (Tx), and the touch sensing electrode (Rx) is formed in a bar shape with a predetermined area. In this case, with respect to a longitudinal direction, a width of the touch sensing electrode (Rx) is smaller than a width of the touch driving electrode (Tx). The touch sensing electrode (Rx) is connected with the touch driving circuit through a sensing routing line (RL2), whereby the touch sensing electrode (Rx) is used as a touch point/force sensing electrode for sensing a touch point or touch force.

The first dummy electrode (Dxa) is formed in a bar shape with a predetermined area, and is provided in parallel to one side of the touch sensing electrode (Rx) along the second direction (Y) on the second substrate 120 being overlapped with the touch driving electrode (Tx). In this case, with respect to the longitudinal direction, the first dummy electrode (Dxa) may be provided at a predetermined interval from one side of the touch sensing electrode (Rx), and a width of the first dummy electrode (Dxa) may be smaller than a width of the touch driving electrode (Tx), or may be the same as a width of the touch sensing electrode (Rx). As the first dummy electrode (Dxa) is connected with the touch driving circuit through a first dummy routing line (RL3), the first dummy electrode (Dxa) may be floating by the touch driving circuit or may be electrically connected with the touch sensing electrode (Rx) or sensing routing line (RL2). In more detail, the first dummy electrode (Dxa) may be electrically floating in a touch point sensing mode, or the first dummy electrode (Dxa) may be electrically connected with the touch sensing electrode (Rx) in a touch force sensing mode. Accordingly, the first dummy electrode (Dxa) is used as a touch force sensing electrode for sensing the touch force, and the first dummy electrode (Dxa) is also used as a floating electrode to enable sensing the touch point.

The second dummy electrode (Dxb) is formed in a bar shape with a predetermined area, and the second dummy electrode (Dxb) is provided in parallel to the other side of the touch sensing electrode (Rx) along the second direction (Y) on the second substrate 120 being overlapped with the touch driving electrode (Tx). In this case, with respect to the longitudinal direction, the second dummy electrode (Dxb) may be provided at a predetermined interval from the other side of the touch sensing electrode (Rx), and a width of the second dummy electrode (Dxb) may be smaller than a width of the touch driving electrode (Tx), or may be the same as a width of the touch sensing electrode (Rx) or first dummy electrode (Dxa). As the second dummy electrode (Dxb) is connected with the touch driving circuit through a second dummy routing line (RL4), the second dummy electrode (Dxb) may be maintained in the floating state by the touch driving circuit, or may be electrically connected with the touch sensing electrode (Rx). In more detail, the second dummy electrode (Dxb) may be electrically floating for the touch point sensing mode, or may be electrically connected with the touch sensing electrode (Rx) or sensing routing line (RL2) for the touch force sensing mode. Accordingly, the second dummy electrode (Dxb) is used as a touch force sensing electrode for sensing the touch force, and the second dummy electrode (Dxb) is used as a floating electrode to enable sensing the touch point.

In FIGS. 2 and 3, each of the first and second dummy electrodes (Dxa, Dxb) is formed in one bar shape, but is not limited to this shape. In order to improve a transmittance of light emitted from the display panel, each of the first and second dummy electrodes (Dxa, Dxb) may be formed in a line structure, a mesh structure or a ladder structure including a plurality of dummy electrodes electrically connected with one another, or may include a plurality of slits at fixed intervals or a plurality of openings arranged in a grid pattern.

The elastic dielectric member 130 is interposed between the first substrate 110 and the second substrate 120. In this case, the elastic dielectric member 130 may be attached to an upper surface of the first substrate 110 or a lower surface of the second substrate 120 by the use of transparent adhesive. The elastic dielectric member 130 may be formed of a material with elasticity and high dielectric constant. For example, the elastic dielectric member 130 may be formed of PDMS (polydimethylsiloxane), acrylic or poly-urethane material, but not be limited to these materials. The elastic dielectric member 130 may be formed of any material with elasticity and high dielectric constant.

Figure 4:
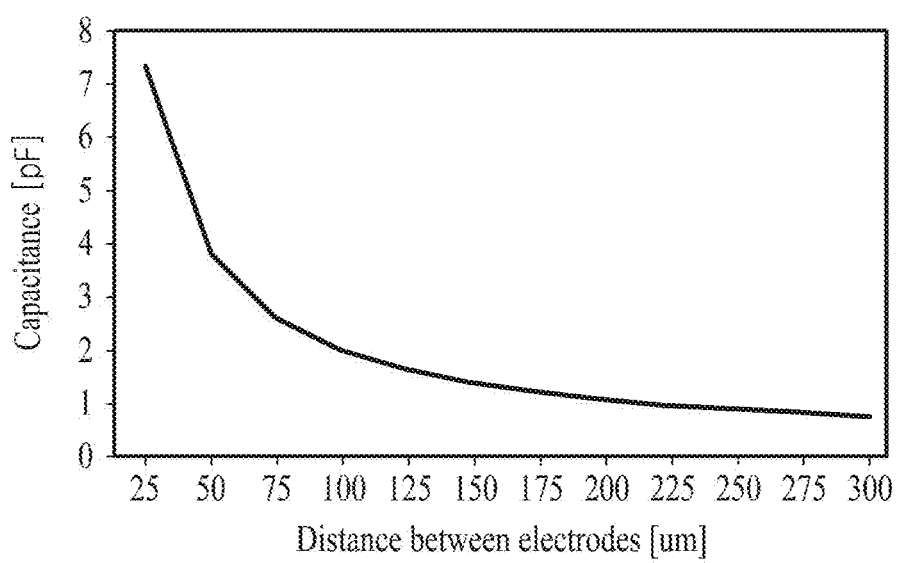
FIG. 4 is a graph for explaining a change of capacitance in accordance with a distance of electrodes overlapping each other with an elastic dielectric member interposed therebetween, shown in FIG. 2.

The elastic dielectric member 130 forms a capacitance (Cm1, Cm2, Cm3) among the touch sensing electrode (Rx), each of the first and second dummy electrodes (Dxa, Dxb), and the touch driving electrode (Tx). Specifically, the elastic dielectric member 130 is changed in its elasticity by a user's touch force, and thus changed in its thickness, to thereby change the capacitance (Cm1, Cm2, Cm3). In this case, the capacitance (Cm1, Cm2, Cm3) may be changed in accordance with each distance among the touch sensing electrode (Rx), each of the first and second dummy electrodes (Dxa, Dxb), and the touch driving electrode (Tx), as shown in FIG. 4. In this case, as the capacitance (Cm1, Cm2, Cm3) is inversely proportional to each distance among the electrodes, the touch force may be sensed by a force level algorithm for modeling an increased variation of the capacitance (Cm1, Cm2, Cm3) in accordance with the touch force.

As the elastic dielectric member 130 with elasticity and high dielectric constant is interposed between the first and second substrates 110 and 120, a first touch sensor (Cm1) for sensing the touch point or touch force is formed at an intersection of the touch driving electrode (Tx) and the touch sensing electrode (Rx). The first touch sensor (Cm1) is formed by a dielectric constant of the elastic dielectric member 130, and a capacitance based on an overlapping area between the touch driving electrode (Tx) and the touch sensing electrode (Rx) and a distance between the touch driving electrode (Tx) and the touch sensing electrode (Rx). In this case, an electric charge corresponding to a touch driving pulse supplied to the touch driving electrode (Tx) is charged in the first touch sensor (Cm1), and the electric charge of the first touch sensor (Cm1) is discharged to the touch sensing electrode (Rx). An amount of electric charge in the first touch sensor (Cm1) varies according to whether or not there is a user's touch.

Figure 5A:
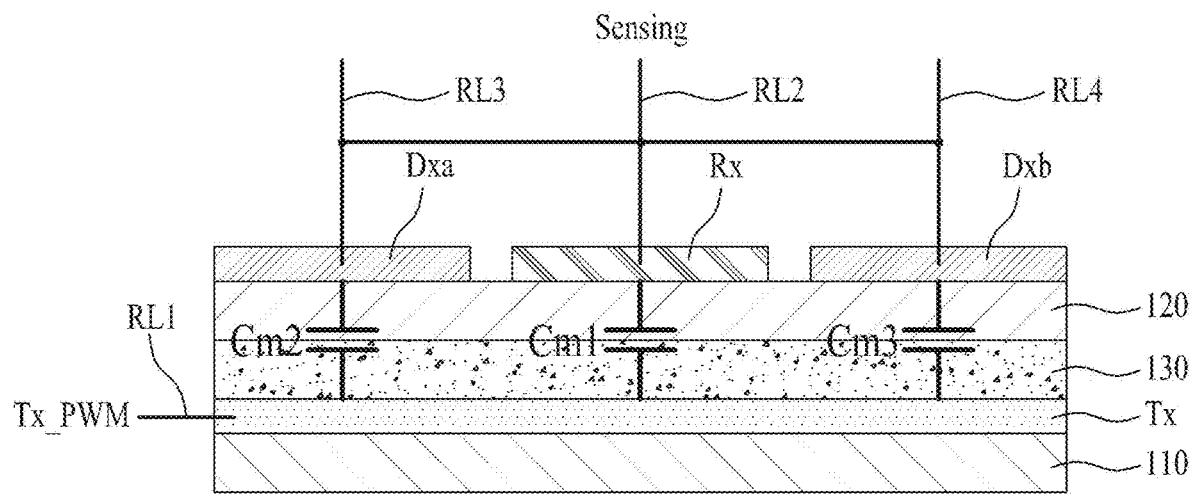
FIGS. 5A and 5B are cross sectional views of the touch panel shown in FIG. 2 illustrating a change of capacitance among electrodes overlapping each other with an elastic dielectric member interposed in-between in a touch force sensing mode and a touch point sensing mode, respectively.

As shown in FIG. 5A, when the first dummy electrode (Dxa) is electrically connected with the touch sensing electrode (Rx) or sensing routing line (RL2) in accordance with the touch force sensing mode, the first dummy electrode (Dxa) functions as the touch force sensing electrode which is identical to the touch sensing electrode (Rx), whereby a second touch sensor (Cm2) for sensing the touch force is formed at an intersection between the touch driving electrode (Tx) and the first dummy electrode (Dxa).

The second touch sensor (Cm2) is formed by a dielectric constant of the elastic dielectric member 130, and a capacitance based on an overlapping area between the touch driving electrode (Tx) and the first dummy electrode (Dxa) and a distance between the touch driving electrode (Tx) and the first dummy electrode (Dxa). As shown in FIG. 4, the capacitance of the second touch sensor (Cm2) varies in accordance with the distance between the touch driving electrode (Tx) and the first dummy electrode (Dxa). In this case, an electric charge corresponding to a touch driving pulse (Tx_PWM) supplied to the touch driving electrode (Tx) is charged in the second touch sensor (Cm2), and the electric charge of the second touch sensor (Cm2) is discharged to the first dummy electrode (Dxa). An amount of electric charge in the second touch sensor (Cm2) varies in accordance with the distance between the touch driving electrode (Tx) and the first dummy electrode (Dxa) by a user's touch force.

Figure 5B:
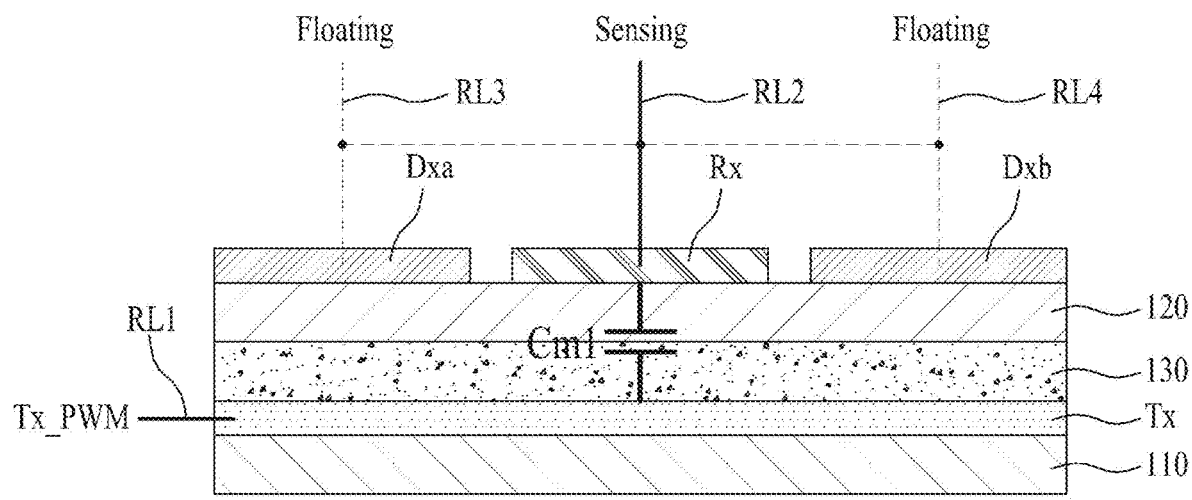

Meanwhile, as shown in FIG. 5B, when the first dummy electrode (Dxa) is electrically floating without being connected with the touch sensing electrode (Rx) in accordance with the touch point sensing mode, the capacitance (Cm2) is not formed between the touch driving electrode (Tx) and the first dummy electrode (Dxa). Accordingly, the capacitance of the first touch sensor (Cm1) formed between the touch driving electrode (Tx) and the touch sensing electrode (Rx) is changed in accordance with the touch by the use of conductive object, whereby it is possible to sense the touch point, and furthermore to improve sensing efficiency of the touch point.

As shown in FIG. 5A, when the second dummy electrode (Dxb) is electrically connected with the touch sensing electrode (Rx) or sensing routing line (RL2) in accordance with the touch force sensing mode, the second dummy electrode (Dxb) functions as the touch force sensing electrode which is identical to the touch sensing electrode (Rx), whereby a third touch sensor (Cm3) for sensing the touch force is formed at an intersection between the touch driving electrode (Tx) and the second dummy electrode (Dxb). The third touch sensor (Cm3) is formed by a dielectric constant of the elastic dielectric member 130, and a capacitance based on an overlapping area between the touch driving electrode (Tx) and the second dummy electrode (Dxb) and a distance between the touch driving electrode (Tx) and the second dummy electrode (Dxb). As shown in FIG. 4, the capacitance of the third touch sensor (Cm3) varies in accordance with the distance between the touch driving electrode (Tx) and the second dummy electrode (Dxb). In this case, an electric charge corresponding to a touch driving pulse (Tx_PWM) supplied to the touch driving electrode (Tx) is charged in the third touch sensor (Cm3), and the electric charge of the third touch sensor (Cm3) is discharged to the second dummy electrode (Dxb). An amount of electric charge in the third touch sensor (Cm3) varies in accordance with the distance between the touch driving electrode (Tx) and the second dummy electrode (Dxb) by a user's touch force.

Meanwhile, as shown in FIG. 5B, when the second dummy electrode (Dxb) is electrically floating without being connected with the touch sensing electrode (Rx) in accordance with the touch point sensing mode, the capacitance (Cm3) is not formed between the touch driving electrode (Tx) and the second dummy electrode (Dxb). Accordingly, the capacitance of the first touch sensor (Cm1) formed between the touch driving electrode (Tx) and the touch sensing electrode (Rx) is changed in accordance with the touch by the use of conductive object, whereby it is possible to sense the touch point, and furthermore to improve sensing efficiency of the touch point.

Additionally, each of the touch driving electrode (Tx) and the touch sensing electrode (Rx) may be formed in a circular or diamond shape, and each of the first and second dummy electrodes (Dxa, Dxb) may be formed to surround the touch sensing electrode (Rx) on halves. Preferably, each of the electrodes (Tx, Rx, Dxa, Dxb) is formed in the bar shape in order to sufficiently secure the capacitance for sensing the touch point and the capacitance for sensing the touch force, as mentioned above.

The touch panel 100 according to the first embodiment of the present invention facilitates to improve the sensing efficiency of the touch point by electrically floating the first and second dummy electrodes (Dxa, Dxb) in accordance with the touch point sensing mode, and also to improve the sensing efficiency of the touch force by increasing the area of the force sensing electrode for sensing the touch force through the electrical connection between the touch sensing electrode (Rx) and the first and second dummy electrodes (Dxa, Dxb). Hence, a larger capacitance is charged between the touch driving electrode (Tx) and a combination of the touch sensing electrode (Rx) and the first dummy electrode (Dxa) and/or the second dummy electrode (Dxb) in the touch force sensing mode, compared to a capacitance charged between the touch driving electrode (Tx) and the touch sensing electrode (Rx) in the touch point sensing mode. Large capacitance charged between the touch driving electrode (Tx) and the combination of the touch sensing electrode (Rx) and the first dummy electrode (Dxa) and/or the second dummy electrode (Dxb) in the touch force sensing mode enables accurate sensing of touch force. In addition, less capacitance charged between the touch driving electrode (Tx) and the touch sensing electrode (Rx) in the touch point sensing mode enables enough fringe field to be formed between the touch driving electrode (Tx) and the touch sensing electrode (Rx) to allow accurate sensing of touch point (or whether a specific electrode is touched or not). Eventually, the touch panel 100 according to the first embodiment of the present invention enables to improve both the touch force sensing efficiency and the touch point sensing efficiency.

Figure 6:
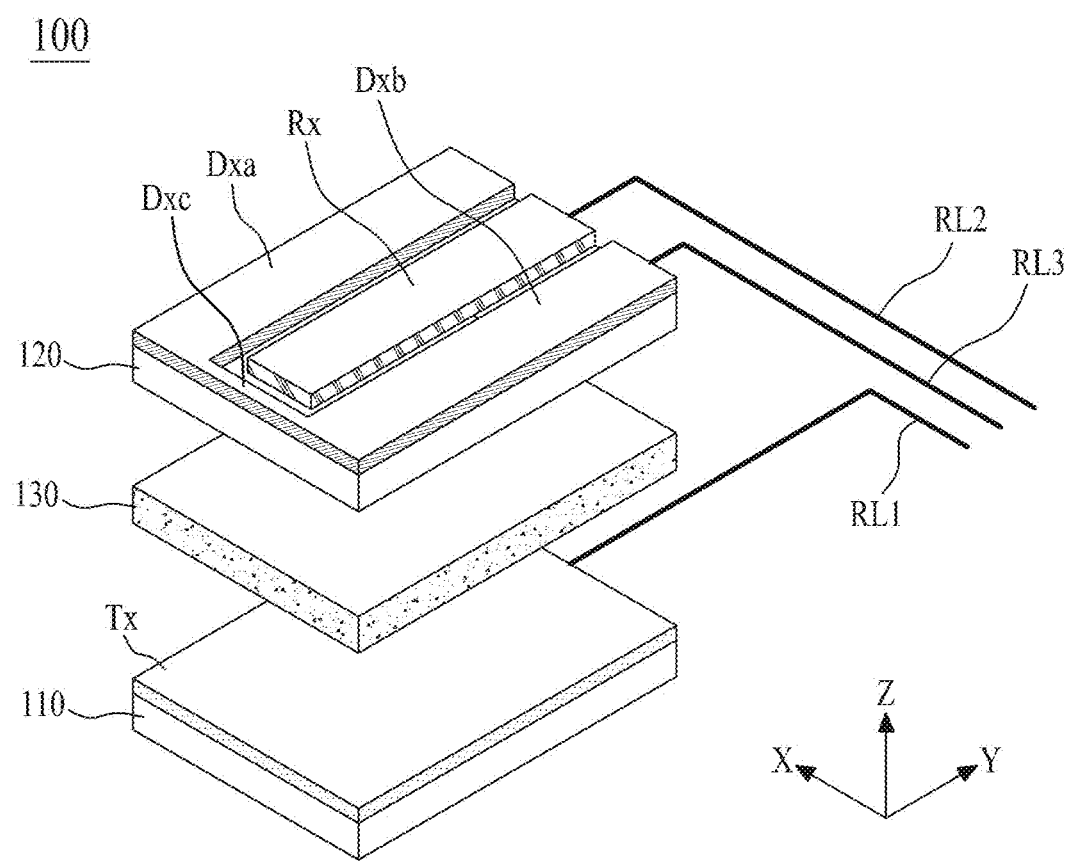
FIG. 6 illustrates a modified example of the touch panel according to the first embodiment of the present invention.

FIG. 6 illustrates a modified example of the touch panel according to the first embodiment of the present invention, wherein one side of the first dummy electrode is electrically connected with one side of the second dummy electrode. Hereinafter, only the first and second dummy electrodes will be described in detail as follows.

One side of the first dummy electrode (Dxa) is electrically connected with one side of the second dummy electrode (Dxb) through a dummy bridge electrode (Dxc).

The dummy bridge electrode (Dxc) is provided at a predetermined interval from one side of the touch sensing electrode (Rx) while being in parallel to one side of the touch sensing electrode (Rx), whereby the dummy bridge electrode (Dxc) is electrically connected with both one side of the first dummy electrode (Dxa) and one side of the second dummy electrode (Dxb). Accordingly, the dummy bridge electrode (Dxc) and the first and second dummy electrodes (Dxa, Dxb) are provided in shape of "⊂" or "⊃".

Additionally, one side of the first dummy electrode (Dxa) is electrically connected with one side of the second dummy electrode (Dxb) through the dummy bridge electrode (Dxc), whereby it is possible to omit any one of the first and second dummy routing lines (RL3, RL4). Accordingly, a width of edge in the touch panel 100 provided with the routing line is reduced so that a bezel width of the touch panel 100 is reduced.

Figure 7:
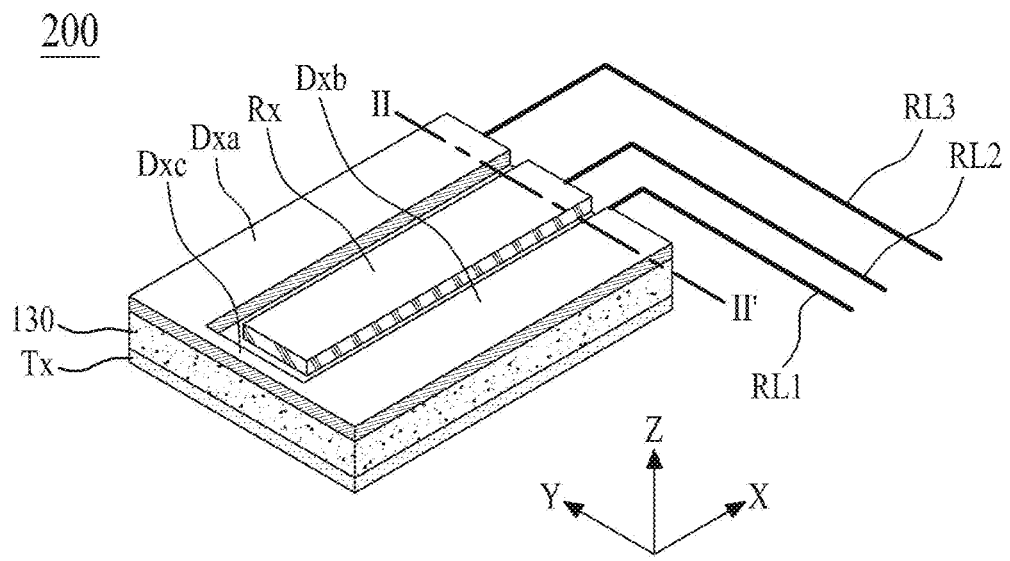
FIG. 7 illustrates a simplified structure of a touch panel according to the second embodiment of the present invention.
Figure 8:
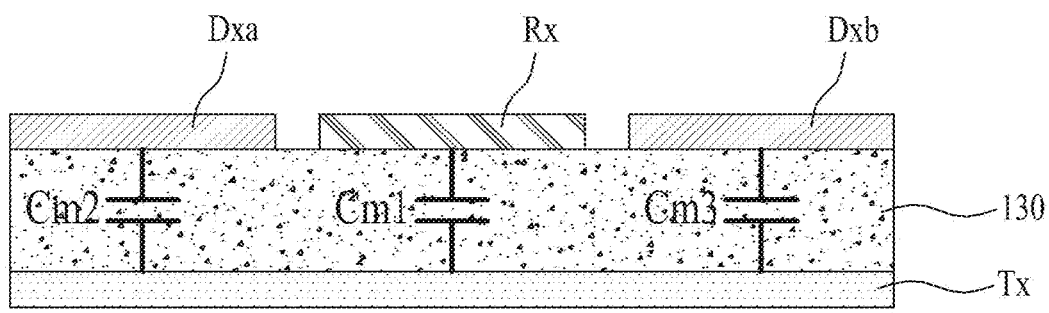
FIG. 8 is a cross sectional view of the touch panel along II-II' shown in FIG. 7.

FIG. 7 illustrates a simplified structure of a touch panel 200 according to the second embodiment of the present invention. FIG. 8 is a cross sectional view of the touch panel 200 along II-II' shown in FIG. 7.

As shown in FIG. 7, a touch panel 200 according to the second embodiment of the present invention is obtained by providing the touch driving electrode (Tx) on a lower surface of the elastic dielectric member 130, and providing the touch sensing electrode (Rx) and the first and second dummy electrodes (Dxa, Dxb) on an upper surface of the elastic dielectric member 130 in the aforementioned touch panel 100 according to the first embodiment of the present invention. That is, in case of the touch panel 200 according to the second embodiment of the present invention, the aforementioned first and second substrates 110 and 120 are removed from the touch panel 200. Except that the first and second substrates 110 and 120 are removed from the touch panel 200, the touch panel 200 according to the second embodiment of the present invention is identical in electrode structure to the touch panel 100 of FIG. 6, whereby it is possible to sense both the touch point and the touch force, and to realize a thin profile of the touch panel by the simplified structure.

In FIGS. 7 and 8, one side of the first dummy electrode (Dxa) is electrically connected with one side of the second dummy electrode (Dxb) through the dummy bridge electrode (Dxc), but is not limited to this structure. That is, it is possible to omit the dummy bridge electrode (Dxc). In this case, the electrode structure of the touch panel 200 according to the second embodiment of the present invention may be identical to the electrode structure of the touch panel 100 shown in FIG. 2, whereby the touch driving electrode (Tx) may be formed on the lower surface of the elastic dielectric member 130, and the touch sensing electrode (Rx) and the first and second dummy electrodes (Dxa, Dxb) may be formed on the upper surface of the elastic dielectric member 130.

The lower surface of the touch panel 200 according to the second embodiment of the present invention, that is, the touch driving electrode (Tx) may be attached to the upper surface of the display panel by the use of transparent adhesive. The upper surface of the touch panel 200 according to the second embodiment of the present invention, that is, the touch sensing electrode (Rx) and the first and second dummy electrodes (Dxa, Dxb) may be covered with the cover window by the use of transparent adhesive.

In the aforementioned first and second embodiments of the present invention, each of the touch panels 100 and 200 includes the first and second dummy electrodes (Dxa, Dxb), but is not limited to this structure. According to a modified example of the present invention, each of the touch panels 100 and 200 may include the first and second dummy electrodes (Dxa, Dxb), wherein any one of the first and second dummy electrodes (Dxa, Dxb) may be electrically floating without regard to the sensing mode, and another thereof may be electrically floating or connected with the touch sensing electrode in accordance with the sensing mode. According to another modified example of the present invention, each of the touch panels 100 and 200 may include any one of the first and second dummy electrodes (Dxa, Dxb). In this case, it may cause the decrease in the area of electrode used as the touch sensing electrode for sensing the touch force in accordance with the touch force sensing mode, however, it also may cause the increase in the area of electrode used as the touch sensing electrode for sensing the touch point in accordance with the touch point sensing mode, to thereby improve the efficiency for sensing the touch point.

Figure 9:
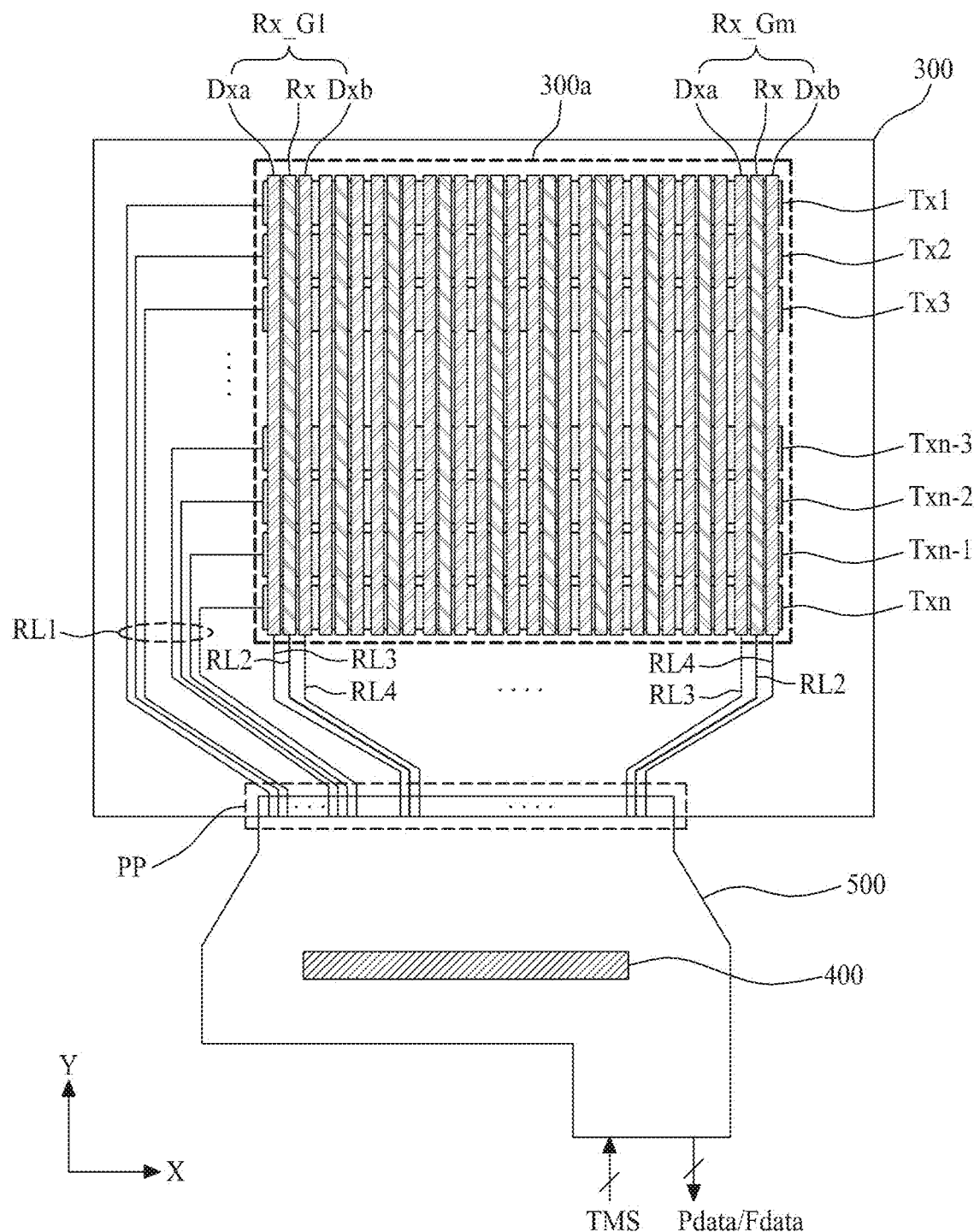
FIG. 9 illustrates a driving apparatus of a touch panel according to one embodiment of the present invention.
Figure 10:
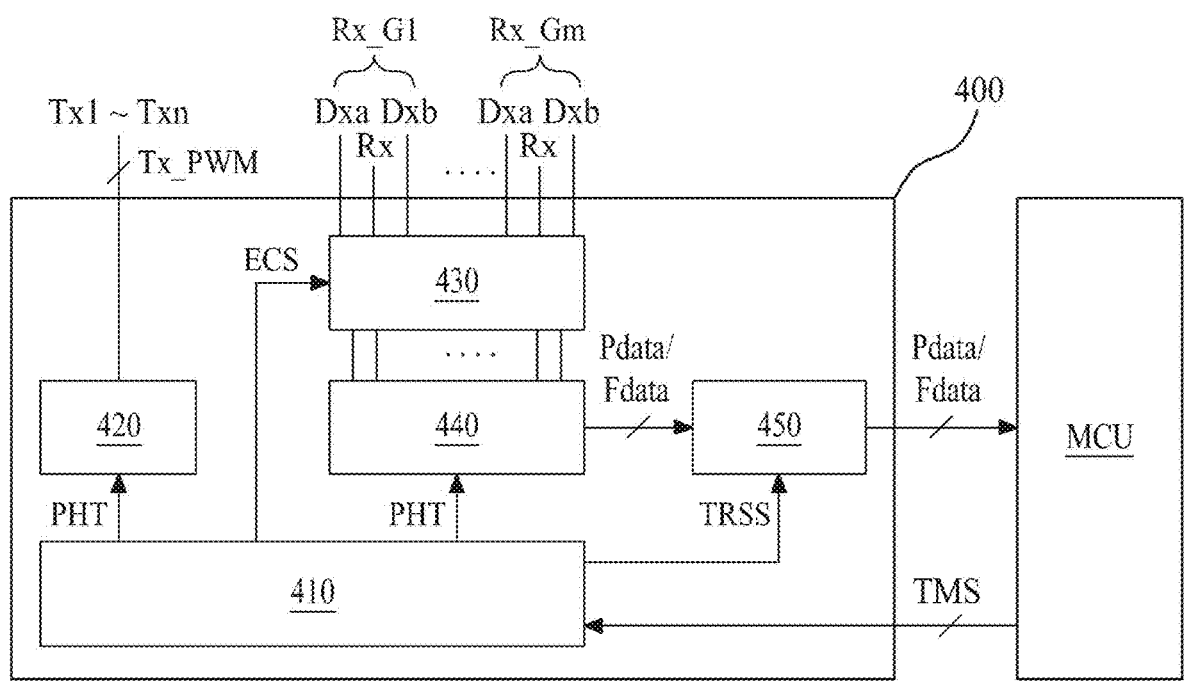
FIG. 10 is a block diagram for explaining a touch driving circuit of FIG. 9.

FIG. 9 illustrates a driving apparatus of touch panel according to one embodiment of the present invention. FIG. 10 is a block diagram for explaining a touch driving circuit of FIG. 9.

Referring to FIGS. 9 and 10, the driving apparatus of touch panel according to one embodiment of the present invention may include a touch panel 300 and a touch driving circuit 400.

The touch panel 300 may include first to n-th touch driving electrodes (Tx1~Txn), an elastic dielectric member (See FIG. 2) disposed on the first to n-th touch driving electrodes (Tx1~Txn), and first to m-th touch sensing electrode groups (Rx_G1~Rx_Gm) disposed on the elastic dielectric member, and respectively overlapped and intersected with the respective first to n-th touch driving electrodes (Tx1~Txn).

The first to n-th touch driving electrodes (Tx1~Txn) are provided at fixed intervals in a first direction (X) on a touch sensing area 300a of the touch panel 300. The first to n-th touch driving electrodes (Tx1~Txn) are connected with a touch driving circuit 400 through a pad portion (PP) and corresponding driving routing line (RL1) formed in a first edge of the touch panel 300. The first to n-th touch driving electrode (Tx1~Txn) may be formed on the first substrate (See FIG. 2), or may be formed on the lower surface of the elastic dielectric member (See FIG. 7).

The elastic dielectric member may be formed of a material with elasticity and dielectric constant, and may be disposed on the first to n-th touch driving electrodes (Tx1 Txn). This elastic dielectric member is the same as the elastic dielectric member 130 shown in FIGS. 2 and 3, whereby a detailed description for the elastic dielectric member will be omitted.

The first to m-th touch sensing electrode groups (Rx_G1~Rx_Gm) are formed at fixed intervals in a second direction (Y) on the touch sensing area 300a of the touch panel 300, wherein the first to m-th touch sensing electrode groups (Rx_G1~Rx_Gm) respectively intersect with the first to n-th touch driving electrodes (Tx1~Txn). The first to m-th touch sensing electrode groups (Rx_G1~Rx_Gm) may be formed on the second substrate (See FIG. 2), or may be formed on the upper surface of the elastic dielectric member (See FIG. 7).

Each of the first to m-th touch sensing electrode groups (Rx_G1~Rx_Gm) may include the touch sensing electrode (Rx), first dummy electrode (Dxa) and second dummy electrode (Dxb).

The touch sensing electrode (Rx) is used as a touch point/force sensing electrode for sensing a touch point or touch force. The touch sensing electrode (Rx) is connected with the touch driving circuit 400 through the pad portion (PP) and sensing routing line (RL2) formed in a second edge of the touch panel 300. The touch sensing electrode (Rx) is identical to the touch sensing electrode (Rx) shown in FIGS. 2 and 3, wherein a detailed description for the touch sensing electrode (Rx) will be omitted.

The first dummy electrode (Dxa) may be used only as the touch force sensing electrode for sensing the touch force. The first dummy electrode (Dxa) is connected with the touch driving circuit 400 through the pad portion (PP) and first dummy routing line (RL3) formed in the second edge of the touch panel 300. That is, the first dummy electrode (Dxa) for each of the first to m-th touch sensing electrode groups (Rx_G1~Rx_Gm) may be electrically floating by the touch driving circuit 400, or may be electrically connected with the touch sensing electrode (Rx) or sensing routing line (RL2). The first dummy electrode (Dxa) is identical to the first dummy electrode (Dxa) shown in FIGS. 2 and 3, whereby a detailed description for the first dummy electrode (Dxa) will be omitted.

The second dummy electrode (Dxb) may be used only as the touch force sensing electrode for sensing the touch force. The second dummy electrode (Dxb) is connected with the touch driving circuit 400 through the pad portion (PP) and second dummy routing line (RL4) formed in the second edge of the touch panel 300. That is, the second dummy electrode (Dxb) for each of the first to m-th touch sensing electrode groups (Rx_G1~Rx_Gm) may be electrically floating by the touch driving circuit 400, or may be electrically connected with the touch sensing electrode (Rx) or sensing routing line (RL2). The second dummy electrode (Dxb) is identical to the second dummy electrode (Dxb) shown in FIGS. 2 and 3, whereby a detailed description for the second dummy electrode (Dxb) will be omitted.

The touch driving circuit 400 is provided on a flexible circuit film 500 attached to the pad portion (PP) of the touch panel 300, and is connected with each of the routing lines (RL1, RL2, RL3, RL4) through the pad portion (PP). Alternatively, the touch driving circuit 400 may be provided on a printed circuit board (not shown). In this case, the touch driving circuit 400 may be connected with each of the routing lines (RL1, RL2, RL3, RL4) through a flexible circuit film (not shown) connected between the printed circuit board and the pad portion (PP) of the touch panel 300.

The touch driving circuit 400 supplies a touch driving pulse (Tx_PWM) to each of the first to n-th touch driving electrodes (Tx1~Txn), and also senses a touch sense signal indicating a change of capacitance through each of the first to m-th touch sensing electrode groups (Rx_G1~Rx_Gm). For example, the touch driving circuit 400 drives the touch panel 300 by a time division method in accordance with the touch point sensing mode or touch force sensing mode, to thereby generate touch point sensing data (Pdata) or touch force sensing data (Fdata).

For the touch point sensing mode, after the touch driving circuit 400 electrically floats the first and second dummy electrodes (Dxa, Dxb) for each of the plurality of touch sensing electrode groups (Rx_G1~Rx_Gm), the touch driving circuit 400 sequentially supplies the touch driving pulse (Tx_PWM) to each of the first to n-th touch driving electrodes (Tx1~Txn), and simultaneously senses the touch sense signal indicating the change of charge amount in the first touch sensor (Cm1, See FIG. 5B) through the touch sensing electrode (Rx) for each of the first to m-th touch sensing electrode groups (Rx_G1~Rx_Gm), to thereby generate touch point sensing data (Pdata).

For the touch force sensing mode, after the touch driving circuit 400 electrically connects the first and second dummy electrodes (Dxa, Dxb) to the touch sensing electrode (Rx) in a unit of the first to m-th touch sensing electrode groups (Rx_G1~Rx_Gm), the touch driving circuit 400 sequentially supplies the touch driving pulse (Tx_PWM) to each of the first to n-th touch driving electrodes (Tx1~Txn), and simultaneously senses the touch sense signal indicating the change of charge amount in the first to third touch sensors (Cm1, Cm2, Cm3) through the touch sensing electrode (Rx) for each of the first to m-th touch sensing electrode groups (Rx_G1~Rx_Gm), to thereby generate touch force sensing data (F data).

The touch driving circuit 400 according to one embodiment of the present invention may include a timing generating part 410, a driving pulse supplying part 420, an electrode connecting part 430, a sensing part 440 and a sensing data processing part 450. The touch driving circuit 400 of the above structure may be integrated as one ROIC (Readout Integrated Circuit) chip. However, the sensing data processing part 450 may be implemented as MCU (Micro Controller Unit) of host system without being integrated with the ROIC chip.

The timing generating part 410 generates a sensing start signal (PHT) in response to a touch mode signal (TMS) supplied from the MCU of host system, and controls a driving timing for each of the driving pulse supplying part 420 and the sensing part 440. In this case, the touch mode signal (TMS) may be any one selected among a touch point sensing mode signal, a touch force sequential sensing mode signal, a touch force partial sensing mode signal and a touch force group sensing mode signal. Accordingly, the timing generating part 410 may generate touch control signals including sensing start signal (PHT), Tx channel setup signal, electrode connection signal (ECS), Rx channel setup signal and touch report synchronization signal (TRSS) on the basis of touch mode signal (TMS).

The driving pulse supplying part 420 supplies the touch driving pulse (Tx_PWM) to the touch driving electrode (Tx1~Txn) on the basis of sensing start signal (PHT) and Tx channel setup signal supplied from the timing generating part 410. That is, the driving pulse supplying part 420 selects a TX channel, to which the touch driving pulse (Tx_PWM) is to be output, in response to the TX channel setup signal of the timing generating part 410, generates the touch driving pulse (Tx_PWM) synchronized with the sensing start signal (PHT), and supplies the touch driving pulse (Tx_PWM) to the corresponding touch driving electrode (Tx1~Txn) through the driving routing line (Tx1~Txn) connected with the selected Tx channel. For example, in case of the touch point sensing mode or touch force sequential sensing mode, the driving pulse supplying part 420 may sequentially supply the touch driving pulse (Tx_PWM) to the first to n-th touch driving electrodes (Tx1~Txn). In case of the touch force partial sensing mode, the driving pulse supplying part 420 may sequentially supply the touch driving pulse (Tx_PWM) to the plurality of touch driving electrodes partially selected among the first to n-th touch driving electrodes (Tx1~Txn). The touch force partial sensing mode herein refers to a mode in which one or more touch driving electrodes (TX) are driven individually one at a time. In case of the touch force group sensing mode, the driving pulse supplying part 420 may sequentially supply the touch driving pulse (Tx_PWM) to a plurality of groups, wherein each group may include the two or more touch driving electrodes among the first to n-th touch driving electrodes (Tx1~Txn). The touch force group sensing mode herein refers to a mode in which touch driving electrodes (TX) in a group are driven simultaneously.

In response to the electrode connection signal (ECS) supplied from the timing generating part 410, the electrode connecting part 430 electrically floats the first and second dummy electrodes (Dxa, Dxb) in a unit of the first to m-th touch sensing electrode groups (Rx_G1~Rx_Gm) or electrically connects the first and second dummy electrodes (Dxa, Dxb) to the touch sensing electrode (Rx). For example, the electrode connecting part 430 electrically floats the first and second dummy routing lines (RL3, RL4) for each of the first to m-th touch sensing electrodes groups (Rx_G1~Rx_Gm) in response to the electrode connection signal (ECS) in accordance with the touch point sensing mode, whereby the first and second dummy electrodes (Dxa, Dxb) are electrically floating in a unit of the first to m-th touch sensing electrode groups (Rx_G1~Rx_Gm). Also, the electrode connecting part 430 electrically connects the first and second dummy routing lines (RL3, RL4) to the sensing routing line (RL2) in a unit of the first to m-th touch sensing electrode groups (Rx_G1~Rx_Gm) in response to the electrode connection signal (ECS) in accordance with the touch force sequential sensing mode, the touch force partial sensing mode and the touch force group sensing mode.

The sensing part 440 generates a sensing signal obtained by sensing the change of charge amount in the touch sensor through the touch sensing electrode (Rx) for each of the first to m-th touch sensing electrode groups (Rx_G1~Rx_Gm) connected with the electrode connecting part 430 on the basis of sensing start signal (PHT) and Rx channel setup signal, and generates touch point sensing data (Pdata) or touch force sensing data (Fdata) by an analog-to-digital conversion of the sensing signal. For example, in case of the touch point sensing mode, the sensing part 440 senses the change of charge amount in the touch sensor (Cm1, See FIG. 5B) through the touch sensing electrode (Rx) for each of the first to m-th touch sensing electrode groups (Rx_G1~Rx_Gm), and generates the touch point sensing data (Pdata) based on the change of charge amount. Also, in case of the touch force sequential sensing mode, touch force partial sensing mode and touch force group sensing mode, the sensing part 440 senses the change of charge amount in the touch sensor (Cm1, Cm2 and Cm3, See FIG. 5A) through the first and second dummy electrodes (Dxa, Dxb) and touch sensing electrode (Rx) for each of the first to m-th touch sensing electrode groups (Rx_G1~Rx_Gm), and generates the touch force sensing data (Fdata) based on the change of charge amount.

The sensing part 440 according to one embodiment of the present invention may generate the sensing signal by amplifying a difference of the signals from the adjacent two Rx channels, and sampling the amplified signal. The sensing part 440 according to one embodiment of the present invention amplifies the difference between the signals of the adjacent two touch sensing electrodes and reduces noise ingredient input due to a parasitic capacitance of the touch panel 300, to thereby improve a signal-to-noise ratio. To this end, the sensing part 440 according to one embodiment of the present invention may include an integrator comprising a differential amplifier.

The sensing part 440 according to another embodiment of the present invention may compare a signal received from one Rx channel with a reference voltage, and may generate the sensing signal based on the comparison result. In this case, the sensing part 440 according to another embodiment of the present invention may include a comparator.

The sensing data processing part 450 receives the touch point sensing data (Pdada) or touch force sensing data (Fdata) from the sensing part 440, sequentially stores the received data in an internal memory, and transmits the touch point sensing data (Pdata) or touch force sensing data (Fdata) stored in the internal memory to the MCU of host system in response to the touch report synchronization signal (TRSS) in accordance with a preset interface method.

The MCU of host system receives the touch point sensing data (Pdata) from the sensing data processing part 450, compares the received touch point sensing data (Pdata) with a preset point sensing threshold value to determine whether or not there is a user's touch and the touch point coordinates. In one aspect, the MCU determines that a coordinate of the touch panel is touched, if the touch point sensing data corresponding to the coordinate is larger than the point sensing threshold value. That is, the MCU calculates the touch point coordinates value (XY coordinates) based on point information (X-coordinate) of the touch sensing electrode (Rx) with the touch point sensing data (Pdata) and point information (Y-coordinate) of the touch driving electrode (Tx) being driven. In addition, the MCU may calculate the number of touch points from the calculated touch point coordinates, calculate the number of times being touched by counting the calculated number of touch points in a unit time period, or calculate a touch continuance time in a unit time period.

Also, the MCU of host system receives the touch force sensing data (Fdata) from the sensing data processing part 450, compares the received touch force sensing data (Fdata) with a preset force sensing threshold value, and calculates the touch point coordinates and a size of touch force by the use of touch force sensing data, if the touch force sensing data is larger than the force sensing threshold value. That is, the MCU calculates the touch force coordinates value (XY coordinates) based on point information (X-coordinate) of the touch sensing electrode (Rx) with the touch force sensing data (Fdata) and point information (Y-coordinate) of the touch driving electrode (Tx) being driven, and also calculates the size of touch force based on a size of the touch force sensing data (Fdata).

Additionally, the touch driving circuit 400 may comprise a touch MCU which calculates whether or not there is a user's touch, the touch point coordinates and the size of touch force by the use of touch point sensing data (Pdata) and/or touch force sensing data (Fdata), and transmits the calculated results to the MCU. In this case, the MCU of the host system may only execute an application program linked to the touch point coordinates and the size of touch force provided from the touch MCU of host system.

Figure 11:
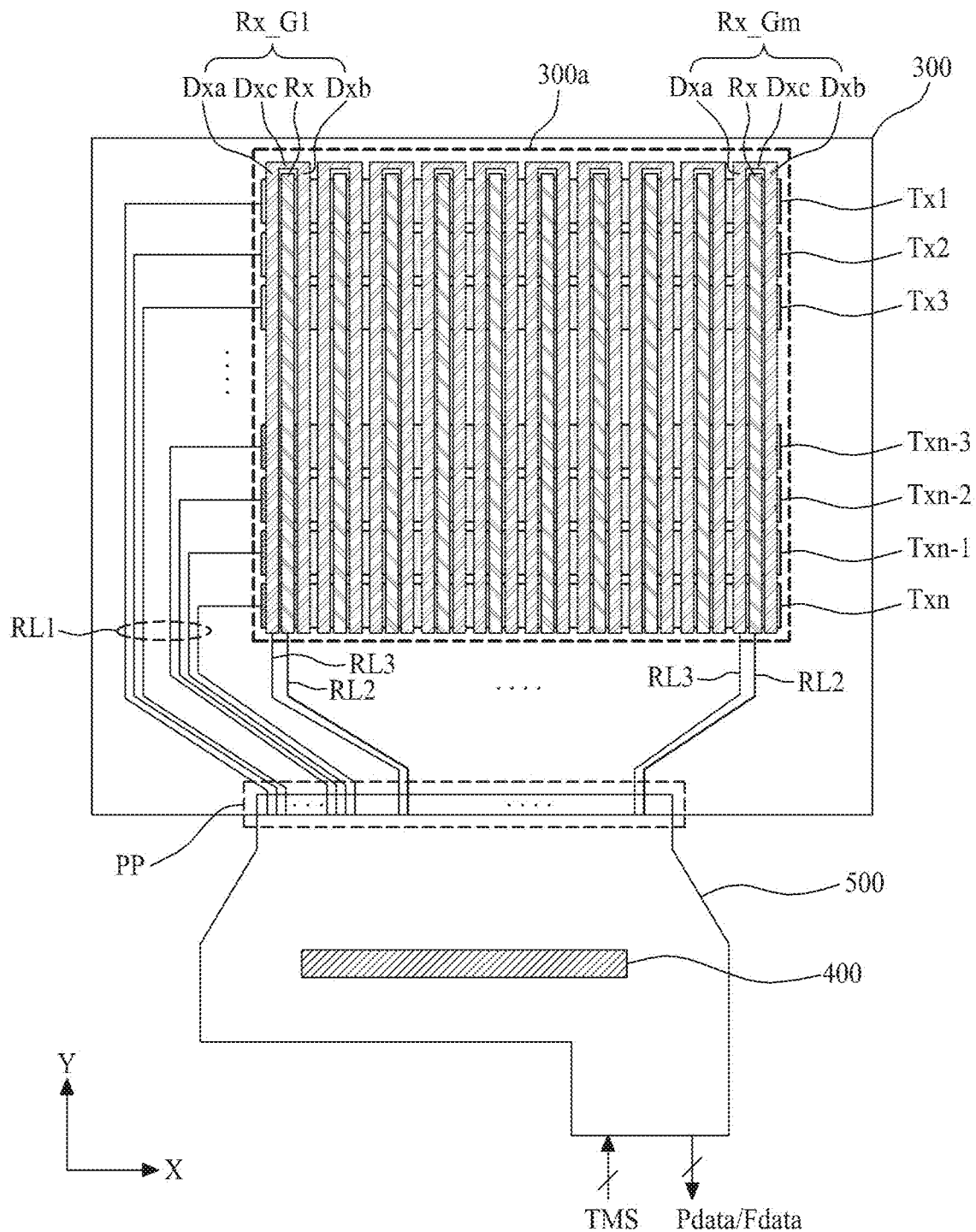
FIG. 11 illustrates a modified example of the touch panel in the driving apparatus according to one embodiment of the present invention.

Meanwhile, as shown in FIGS. 6 and 11, each of the first to m-th touch sensing electrode groups (Rx_G1~Rx_Gm) may further include the dummy bridge electrode (Dxc) for electrically connecting one side of the first dummy electrode (Dxa) with one side of the second dummy electrode (Dxb). In this case, one side of the first dummy electrode (Dxa) is electrically connected with one side of the second dummy electrode (Dxb) through the dummy bridge electrode (Dxc) in a unit of the first to m-th touch sensing electrode groups (Rx_G1~Rx_Gm), whereby any one of the first and second dummy routing lines (RL3, RL4), for example, the second dummy routing line (RL4) may be omitted. Accordingly, the electrode connecting part 430 of the touch driving circuit 400 electrically floats the first dummy routing line (RL3) in response to the electrode connection signal (ECS) in accordance with the touch point sensing mode, whereby the electrode connecting part 430 electrically floats the first and second dummy electrodes (Dxa, Dxb) for each of the first to m-th touch sensing electrode groups (Rx_G1~Rx_Gm). The electrode connecting part 430 electrically connects the first dummy routing line (RL3) with the sensing routing line (RL2) in response to the electrode connection signal (ECS) in accordance with the touch force sequential sensing mode, the touch force partial sensing mode and the touch force group sensing mode, whereby the first and second dummy electrodes (Dxa, Dxb) are electrically connected with the corresponding touch sensing electrode (Rx) in a unit of the first to m-th touch sensing electrode groups (Rx_G1~Rx_Gm).

Figure 12:
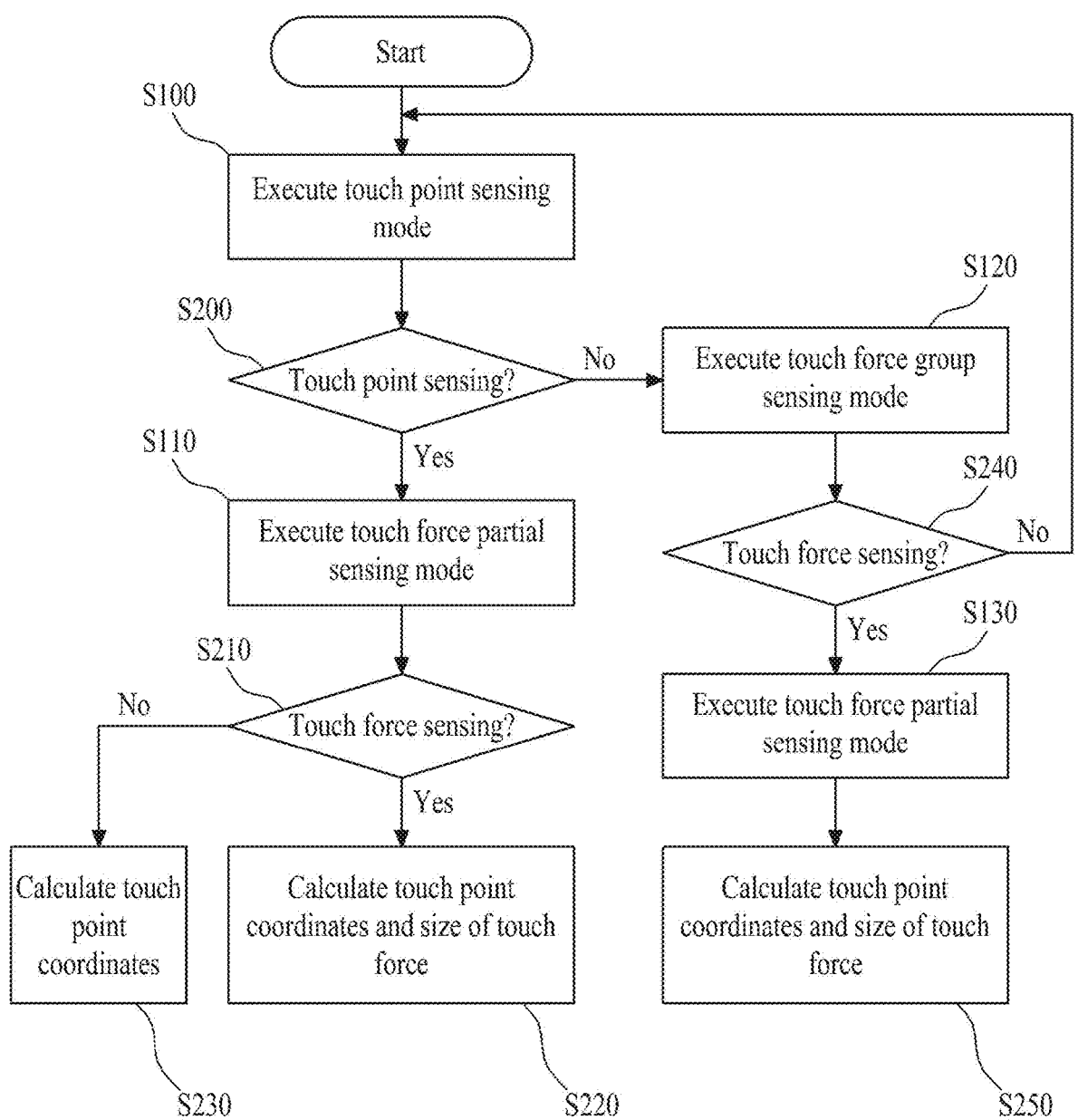
FIG. 12 is a flow chart for explaining a driving method of the touch panel according to one embodiment of the present invention.

FIG. 12 is a flow chart for explaining a driving method of the touch panel according to one embodiment of the present invention.

In connection with FIGS. 9 and 10, FIG. 12 is a flow chart for explaining the driving method of the touch panel according to one embodiment of the present invention.

First, after the touch driving circuit 400 electrically floats the first and second dummy electrodes (Dxa, Dxb) for each of the first to m-th touch sensing electrode groups (Rx_G1~Rx_Gm) in accordance with the touch point sensing mode, the touch driving circuit 400 sequentially supplies the touch driving pulse (Tx_PWM) to each of the first to n-th touch driving electrodes (Tx1~Txn), and simultaneously senses the change of charge amount in the first touch sensor (Cm1, See FIG. 5B) through the touch sensing electrode (Rx) for each of the first to m-th touch sensing electrode groups (Rx_G1~Rx_Gm), to thereby generate the touch point sensing data (Pdata) (S100).

For the touch point sensing mode, the MCU determines whether or not there is the touch point sensing on the basis of preset point sensing threshold value and touch point sensing data (Pdata) supplied from the touch driving circuit 400 (S200). Based on the determination result, if there is the touch point sensing ('Yes' of S200), touch point area information is generated, and the touch force partial sensing mode signal is generated and is supplied to the touch driving circuit 400.

Thereafter, after the touch driving circuit 400 electrically connects the first and second dummy electrodes (Dxa, Dxb) to the touch sensing electrode (Rx) in a unit of the touch sensing electrode group (Rx_G1~Rx_Gm) corresponding to the touch point area information in response to the touch force partial sensing mode signal and the touch point area information supplied from the MCU, the touch driving circuit 400 sequentially supplies the touch driving pulse (Tx_PWM) to one or more of the touch driving electrode (Tx1~Txn) corresponding to the touch point area information individually one at a time, and simultaneously senses the change of charge amount in the first to third touch sensors (Cm1, Cm2 and Cm3, See FIG. 5A) through the touch sensing electrode (Rx) of the corresponding touch sensing electrode group (Rx_G1~Rx_Gm), to thereby generate the touch force sensing data (Fdata) (S110).

For the touch force partial sensing mode, the MCU determines whether or not there is the touch force sensing on the basis of touch force sensing data (Fdata) and preset force sensing threshold value (S210). Based on the determination result, if there is the touch force sensing ('Yes' of S210) by the touch force sensing data (Fdata), the touch point coordinates based on the touch point sensing data (Pdata) and the size of touch force are calculated and are supplied to the host system (S220). Meanwhile, if there is no touch force sensing ('No' of S210) by the touch force sensing data (Fdata), the touch point coordinates based on the touch point sensing data (Pdata) generated by the prior touch point sensing mode is calculated and is provided to the host system (S230).

In the step S200 of the touch point sensing mode, if the MCU determines that there is no touch point sensing ('No' of S200), the touch force group sensing mode signal is generated and is provided to the touch driving circuit 400.

After the touch driving circuit 400 electrically connects the first and second dummy electrodes (Dxa, Dxb) to the touch sensing electrode (Rx) in a unit of the first to m-th touch sensing electrode groups (Rx_G1~Rx_Gm) in response to the touch force group sensing mode signal supplied from the MCU, the touch driving circuit 400 sequentially supplies the touch driving pulse (Tx_PWM) to the plurality of touch driving electrode groups, wherein each touch driving electrode group comprises the two or more touch driving electrodes that are supplied with the touch driving pulse simultaneously, and senses the change of charge amount in the first to third touch sensors (Cm1, Cm2 and Cm3, See FIG. 5A) through the touch sensing electrode (Rx) of the corresponding touch sensing electrode group (Rx_G1~Rx_Gm), to thereby generate the touch force sensing data (Fdata) (S120).

For the touch force group sensing mode, the MCU determines whether or not there is the touch force sensing on the basis of touch force data (Fdata) and force sensing threshold value (S240). Based on the determination result, if there is the touch force sensing ('Yes' of S240) by the touch force sensing data (Fdata), touch force area information based on the touch force sensing data (Fdata) is generated, and the touch force partial sensing mode signal is generated and supplied to the touch driving circuit 400.

After the touch driving circuit 400 electrically connects the first and second dummy electrodes (Dxa, Dxb) to the touch sensing electrode (Rx) in a unit of the touch sensing electrode group (Rx_G1~Rx_Gm) corresponding to the touch force area information in response to the touch force partial sensing mode signal and the touch force area information supplied from the MCU, the touch driving circuit 400 sequentially supplies the touch driving pulse (Tx_PWM) to the touch driving electrode (Tx1~Txn) corresponding to the touch force area information individually one at a time, and senses the change of charge amount in the first to third touch sensors (Cm1, Cm2 and Cm3, See FIG. 5A) through the touch sensing electrode (Rx) of the corresponding touch sensing electrode group (Rx_G1~Rx_Gm), to thereby generate the touch force sensing data (Fdata) (S130).

For the touch force partial sensing mode, the MCU calculates the touch point coordinates and the size of touch force, if touch force sensing data (Fdata) supplied from the touch driving circuit 400 is larger than the preset force sensing threshold value, and provides the calculated touch point coordinates and the size of touch force to the host system (S250).

In the step S240 of the touch force group sensing mode, if the MCU determines that there is no touch force sensing ('No' of S240), the MCU generates the touch point sensing mode signal for the touch point sensing mode of the step S100, and supplies the generated signal to the touch driving circuit 400.

In the aforementioned apparatus and method for driving the touch panel according to one embodiment of the present invention, each of the touch sensing electrode groups (Rx_G1~Rx_Gm) of the touch panel 300 includes the first and second dummy electrodes (Dxa, Dxb), but is not limited to this structure. According to a modified example, each of the touch sensing electrode groups (Rx_G1~Rx_Gm) may include the first and second dummy electrodes (Dxa, Dxb), wherein any one of the first and second dummy electrodes (Dxa, Dxb) may be electrically floating without regard to the sensing mode, and another thereof may be electrically floating or connected with the touch sensing electrode in accordance with the sensing mode. According to another modified example, each of the touch sensing electrode groups (Rx_G1~Rx_Gm) may include any one of the first and second dummy electrodes (Dxa, Dxb). In this case, it may cause the decrease in the area of electrode used as the touch sensing electrode for sensing the touch force in accordance with the touch force sensing mode, however, it also may cause the increase in the area of electrode used as the touch sensing electrode for sensing the touch point in accordance with the touch point sensing mode, to thereby improve the efficiency for sensing the touch point.

For the touch point sensing, the first and second dummy electrodes (Dxa, Dxb) are electrically floating, and then the touch point sensing mode is carried out so that it is possible to improve the efficiency for the touch point sensing. For the touch force sensing, the area of the sensing electrode is increased by electrically connecting the first and second dummy electrodes (Dxa, Dxb) with the touch sensing electrode (Rx), and then the touch force sensing mode is carried out so that it is possible to improve the efficiency for the touch force sensing. Specifically, the touch point sensing and the touch force sensing are carried out in the time division driving method, wherein the touch force sensing is carried out dividedly by the touch force group sensing and the touch force partial sensing, whereby it is possible to overcome a problem of the increase in touch driving time caused by the time division driving method.

According to the embodiments of the present invention, the area of the touch sensing electrode overlapped with the touch driving electrode is adjusted in accordance with the touch point sensing and the touch force sensing so that it is possible to improve both touch point sensing efficiency and touch force sensing efficiency.

Also, even though the time division driving method is used for the touch point sensing and the touch force sensing, the partial sensing or group sensing is selectively carried out so that it is possible to overcome the problem of the increase in touch driving time caused by the time division driving method.

It will be apparent to those skilled in the art that various modifications and variations can be made to embodiments of the present invention without departing from the spirit or scope of the invention. Thus, it is intended that the present invention covers the modifications and variations of this invention provided they come within the scope of the appended claims and their equivalents.

What is claimed is:

1. A method of operating a touch panel including first electrodes and second electrodes separated from and intersecting the first electrodes, the second electrodes including touch sensing electrodes and adjacent electrodes adjacent to the touch sensing electrodes, the method comprising:
    applying a touch driving pulse to the first electrodes during a touch force sensing mode to determine a force of a touch on the touch panel and a touch point sensing mode to determine a location of the touch on the touch panel;
    sensing a first touch sense signal responsive to the touch driving pulse in the touch force sensing mode through the touch sensing electrodes and the adjacent electrodes; and
    sensing a second touch sense signal responsive to the touch driving pulse in the touch point sensing mode through the touch sensing electrodes except the adjacent electrodes,
    wherein the adjacent electrodes are not used to sense the second touch sense signal during a first time period, at which the touch point sensing mode is performed, but only used to sense the first touch sense signal responsive to the touch driving pulse during a second time period, at which the touch force sensing mode is performed.

2. The method of claim 1, wherein:
    in the touch force sensing mode, the first touch sense signal is sensed based at least in part on a first capacitance between the first electrodes and the second electrodes including the touch sensing electrodes and the adjacent electrodes responsive to the touch driving pulse, and
    in the touch point sensing mode, the second touch sense signal is sensed based at least in part on a second capacitance between the first electrodes and the touch sensing electrodes responsive to the touch driving pulse, the second capacitance less than the first capacitance.

3. The method of claim 1, further comprising:
in the touch force sensing mode determining the force of the touch on the touch panel based on the first touch sense signal sensed from at least one of the touch sensing electrodes and one or more of the adjacent electrodes adjacent to said one of the touch sensing electrodes; and
in the touch point sensing mode determining the location of the touch on the touch panel based on the second touch sense signal sensed from said one of the touch sensing electrodes but excluding the adjacent electrodes adjacent to said one of the touch sensing electrodes.

4. The method of claim 3, further comprising:
electrically coupling, in the touch force sensing mode, the one or more adjacent electrodes to said one of the touch sensing electrodes; and
electrically decoupling, in the touch point sensing mode, the one or more adjacent electrodes from said one of the touch sensing electrodes.

5. The method of claim 4, further comprising placing, in the touch point sensing mode, the one or more adjacent electrodes in an electrically floating state.

6. The method of claim 3, further comprising:
responsive to determining the location of the touch in the touch point sensing mode, applying the touch driving pulse to one or more electrodes from the first electrodes corresponding to the location of the touch to determine the force of the touch individually one at a time.

7. The method of claim 3, further comprising:
responsive to failing to determine the location of the touch in the touch point sensing mode, applying the touch driving pulse to a group of electrodes from the first electrodes to determine the force of the touch simultaneously.

8. The method of claim 7, further comprising:
responsive to determining the force of the touch through the group of electrodes, selecting one or more electrodes from the group of electrodes and applying the touch driving pulse to the one or more selected electrodes to determine the location and the force of the touch individually one at a time; and
responsive to failing to determine the force of the touch through the group of electrodes, applying the touch driving pulse to the first electrodes in the touch point sensing mode to determine the location of the touch.

* * * * *